Patented June 29, 1948

2,444,307

UNITED STATES PATENT OFFICE 2,444,307

EMULSIFIED FOOD FATS OF IMPROVED KEEPING QUALITIES

Frederic H. Penn, Dallas, Tex.

No Drawing. Application April 27, 1945, Serial No. 590,740

9 Claims. (Cl. 99—163)

This invention relates to food fats, as butter fat, cotton seed oil, soy bean oil, and the like, used in emulsified form, which are consumed as such in the form of butter or margarine, whereby the storage and keeping qualities are improved. This application is a continuation-in-part of my earlier application, Serial No. 572,252, filed January 10, 1945.

In the food fat industry almost all fats and fatty oils used in a dehydrated form, such as shortening, can be preserved against deterioration brought about by oxidation, but when emulsified with water, their storage and keeping qualities are greatly impaired because the dry fats and fatty oils are stored in a homogenous state, whereas the emulsified fats and fatty oils are stored in a heterogenous state, which permits more of the fat surface to be exposed to the air.

Partially hydrogenated cotton seed oils and soy bean oils are used for cooking purposes, such as frying, and as shortenings. These fatty oils are not the source of the flavor in the cooked or baked products. When these fatty oils are used in the manufacture of margarine, they are usually mixed with milk or milk products to improve the flavor of the fatty oils. The control of flavor in dry non-flavor fats used for cooking purposes is not so difficult because the off-flavors caused by oxidation are not so pronounced and are not as detectable in cooked products, whereas similar oxidation deterioration in fats and fatty oils when used in butter or margarine are detectable.

Butter fat is more susceptible to oxidative deterioration than any other fat because it contains more different oxidizable constituents. The most important form of rancidity is that produced by air oxidation.

Butter is in universal use as a food product to a greater extent than any other edible fat that is consumed as such. Its keeping qualities are of an inferior nature. The keeping quality of the average grade of butter is usually not much more than thirty days when handled under normal marketing and household refrigeration conditions, and, in some instances, deterioration starts in about fifteen days.

Commercial creamery butter usually contains 80%–82% butter fat; 2%–3% salt; 15%–16% moisture; 1% curd; lactose, albumin and mineral substances in emulsified form.

Butter fat is different from any other fat; it is a mixture of mixed fatty glycerides, and contains saturated and unsaturated fatty acids. All the definitely known fatty acids are saturated fatty acids, except oleic and linoleic, which are unsaturated fatty acids. Butter fats contain a relatively high percentage of lower fatty acids, whereas most other fats contain relatively smaller amounts of lower fatty acids and higher amounts of higher fatty acids. The linolein and olein content of butter fat ranges from about 30% to about 50%.

The variables of butter fat are many. The chemical and physical characteristics of butter fat are variable because the amount of the different constituents of the cream from which butter fat is obtained varies.

Cows fed oil seed meal, as cotton seed cake, linseed cake, and the like; or summer feeds, as grass and alfalfa, produce butter fat having a large percentage of unsaturated fatty glycerides, as linolein and olein; whereas, cows fed winter feed, as silage and grains, produce butter fat containing less amounts of unsaturated fatty glycerides, which result in seasonal variations in the composition of the butter fat. The age of the cow and stage of lactation affect the composition of butter fat. With increasing age, the percentage of unsaturated fatty glycerides increases.

In the marketing of butter, its keeping quality is of vital importance. Butter to be of good quality must retain its flavor and odor characteristics. Rancidity, putrefaction, and off-flavors are among the most serious problems confronting the butter industry.

In the manufacture of butter, on the completion of the churning, the buttermilk is drawn off and the butter granules washed; salt in the amount of about 2%–3% and sufficient water to make 16% of the butter by weight is added by "working" the butter for the purpose of obtaining a uniform blend or mixture.

On the completion of the churning, the washed butter granules contain moisture in two forms; wash water in the amount of about 4% absorbed on the surface of the butter granules, and about 8% of buttermilk in finely dispersed form, firmly enmeshed in the butter granules.

The buttermilk enmeshed in the butter granules contains serum. Serum is the portion consisting of water and compounds in solution, as lactose and albumin; in suspension, casein; and in part solution and suspension, mineral constituents. Rancidity and off-flavors and the deterioration of butter fat are brought about, to a certain extent, by chemical changes caused by micro-organisms conained in the serum in the butter. The serum in butter is an ideal culture medium for bacteria; it contains the necessary mineral elements considered essential for the growth of bacteria. It also contains a carbohydrate in the form of lactose, and, as the source of nitrogen, contains casein and albumin.

Oxidation occurs when fats containing unsaturated glycerides are exposed to air. Oxidation involves the absorption of oxygen at an ethylenic linkage of the unsaturated fatty glycerides. The oxidation products are oxidic and peroxidic and, on further decomposition, aldehydes, ketones, and low molar fatty acids are formed, which are the cause of oily, tallowy, and other off-flavors in butter fat.

Lecithin, a constituent of butter fat, is subject to oxidative decomposition, with the production of tri-ethylamine, which imparts a fishy flavor to butter fat. Dairy equipment, as pasteurizers, coolers, and the like, as the result of continuous use, lose a portion of the tin protective coating, thereby exposing the underlying metal of copper or iron to the solvent action of the milk, and, as a result, traces of copper or iron are taken up by the milk. Quantities of copper or iron in the amount of three to five parts per million are sufficient to develop an oxidized flavor in butter fat. Butter fat also contains carotin, cholesterol, and diacetyl, all of which are subject to oxidative deterioration.

Creamy butter is a loose emulsion of salt water dispersed in butter fat. The texture and body of the butter, in many instances, are not uniform. The degree of fineness of the dispersed salt water has much influence on the keeping qualities of butter and butter products. It has been found that butter containing loosely dispersed water deteriorates more rapidly than butter containing finely dispersed water in tight emulsion form.

In butter and margarine oxidation is facilitated for the reason that air can diffuse through the mass through the medium of the aqueous films at the interface of the water and fat emulsion.

In order to improve the keeping qualities of butter and butter products, including hydrogenated butter, both oxidative and hydrolytic deterioration must be controlled.

Microbial deterioration of butter and butter fat can be retarded by proper pasteurization or by removal of the serum, adsorbed water and buttermilk from the butter fat.

In accordance with this invention, microbial deterioration of butter fat can be retarded by pasteurization of the cream at 85° C. (185° F.) or by the removal of the serum, adsorbed water, buttermilk and other non-fat soluble components and by pasteurization of the dehydrated butter fat at 85° C. (185° F.).

It is an object of this invention to provide a means for preserving food fats, as butter fats, cotton seed oil, soy bean oil, coconut oil, and similar oils, used in emulsified form for the manufacture of margarine or butter, by the addition of combinations of small amounts, from .02% to .2% of non-toxic anti-oxidants, whereby a synergistic action is brought about to inhibit the deterioration of the fats and fatty oils in emulsified form.

Heretofore, antioxidants, as hydroquinone, pyrogallol, benzoquinone, naphthol, inorganic acids, and amino compounds have been proposed for use as antioxidants, to prevent oxidative deterioration of lard and vegetable oils. Some of these antioxidants affect the odor and taste of the fatty glycerides and some are unsuitable for health purposes.

As butter fat is more susceptible to off-flavor and odors than any other food fat, only antioxidants that do not impart any kind of flavor to butter fat can be used.

In accordance with this invention, the simultaneous use of esters of aromatic hydroxy monobasic acids and aliphatic hydroxy polybasic acids bring about a synergistic action whereby the antioxidant effect obtained by these combined compounds is much more than when used separately.

Emulsifiers suitable for improving dispersion of salt water and the antioxidants in butter fat in finely divided form and to form a tight emulsion and to improve the keeping qualities of butter and butter products are water soluble vegetable gums, as water soluble alginates, locust bean gum, and karaya gum. These emulsifiers permit the incorporation of as much as 50% water in the butter-fat-salt-water emulsion without affecting the texture or the spreadability of the butter product, and may be used as an extender or alternate for butter.

No claim is made herein for the use of vegetable gums in margarine.

Illustrative of one of the methods for making butter:

*Example I.*—Fresh churned creamery butter made from pasteurized cream is heated to 75° C. (167° F.) and centrifuged to remove the curd, adsorbed water, buttermilk, and other non-fatty soluble components. 4.53 kg. (10 lbs.) of the dehydrated butter fat are heated to 85° C. (185° F.) for ten minutes, then cooled to 50° C. (120° F.) and 2.25 grams (0.05% of the weight of the butter fat) of propyl para hydroxy benzoate are added and stirred with a Hobart mixer at 100 R. P. M. for two minutes, and, with continued stirring, .88 kg. (884 grams) of sterile water containing 2.25 grams (.05% of the weight of the butter fat) of tartaric acid, 110 grams (2% of the weight of the butter fat and water) of salt, and 13 grams (1½% of the weight of the water) of sodium alginate in solution are added at the rate of 200 grams a minute and stirred until the mixture commences to solidify, usually at a temperature of 18° C. (64.4° F.) to 19° C. (66.2° F.). The resultant butter is then chilled and packaged as is regular creamery butter.

Illustrative of one of the methods for making margarine:

*Example II.*—A mixture of 33.97 kg. (75 lbs.) of hydrogenated cotton seed oil having an iodine number of 60, and 11.32 kg. (25 lbs.) of hydrogenated soy bean oil having an iodine number of 70 is heated to a temperature of 46° C. (114.8° F.) and 22.5 grams of propyl para hydroxy benzoate are added and mixed in a churn and 8.83 kg. (19.5 lbs.) of cultured milk are added and the mixture churned together. After the mixture has been emulsified, it is chilled and then "worked." During the "working" or blending process, 22.5 grams of tartaric acid in 1000 c. c. of water are "worked" into the margarine with 1.1 kg. (2.2 lbs.) of salt. Should the salt be incorporated into the margarine in solution, the tartaric acid may be dissolved in the salt water solution. Flavor and color may be added and blended into the margarine. After "working" the margarine to the proper consistency, it is ready for packaging.

All mixing operations should be conducted at room temperatures of about 16° C. (60.8° F.) for best results.

The esters of the aromatic para hydroxy monobasic acids should be dissolved in fat or fatty oil by heating, and then added to the butter or the fatty oils at the beginning of the mixing operations. The water soluble aliphatic hydroxy polybasic acids, as tartaric, citric, and malic, should be dissolved in water and then added to the aqueous portion of the emulsion before mixing.

It is customary for the manufacturers of butter to add color and flavor ingredients to the butter; accordingly color and flavor ingredients may be added to the butter products of this invention.

A test for determining the keeping qualities of creamery butter and margarine is the incubation test. Wrapped printed butter or margarine is first held at a temperature of about 7° C. (44.60° F.) to 10° C. (50° F.) for twelve hours, and then is scored for quality. It is then transferred to an incubator which carries a constant temperature of 20° C. (68° F.) to 21° C. (69.8° F.) where it is left for eight days. At the end of this time it is transferred to a refrigerator having a temperature of 7° C. (44.6° F.) to 10° C. (50° F.) and held for twelve hours and then again scored for quality. If there is no appreciable difference in the score, the butter will have good keeping qualities for about thirty days and the margarine for about forty days under normal marketing and household refrigeration conditions.

The efficiency of the synergistic action of the esters of para hydroxy mono-basic acids and the aliphatic hydroxy polybasic acids is evidenced by the following tests:

TABLE I

Tests with butter

[Temperature 20° C. (68° F.) to 21° C. (69.8° F.)]

|  | Incubation time, days |
|---|---|
| Creamery Butter | ² 9 |
| Butter:[1] | |
| 0.1% Methyl para hydroxy benzoate | ² 11 |
| 0.1% Ethyl para hydroxy benzoate | ² 12 |
| 0.1% Propyl para hydroxy benzoate | ² 15 |
| 0.1% Butyl para hydroxy benzoate | ² 15 |
| 0.1% Amyl para hydroxy benzoate | ² 15 |
| 0.1% Benzyl para hydroxy benzoate | ² 15 |
| 0.1% Tartaric acid | ² 10 |
| 0.1% Citric acid | ² 10 |
| 0.1% Malic acid | ² 10 |
| 0.1% Propyl para hydroxy benzoate<br>0.1% Butyl para hydroxy benzoate | ² 18 |
| 0.1% Para hydroxy benzoic acid<br>0.1% Para hydroxy cinnamic acid | ² 16 |
| 0.05% Propyl para hydroxy benzoate<br>0.05% Tartaric acid | ² 26 |
| 0.05% Butyl para hydroxy benzoate<br>0.05% Citric acid | ² 28 |
| 0.05% Benzyl para hydroxy benzoate<br>0.05% Malic acid | ² 32 |

[1] Butter as obtained in Example I.
² Off flavor determined organoleptically.

TABLE II

Tests made with margarine

[Temperature 20° C. (68° F.) to 21° C. (69.8° F.)]

|  | Incubation time, days |
|---|---|
| Margarine[1] | ² 15 |
| 0.1% Methyl para hydroxy benzoate | ² 20 |
| 0.1% Ethyl para hydroxy benzoate | ² 20 |
| 0.1% Propyl para hydroxy benzoate | ² 27 |
| 0.1% Butyl para hydroxy benzoate | ² 27 |
| 0.1% Benzyl para hydroxy benzoate | ² 27 |
| 0.1% Tartaric acid | ² 18 |
| 0.1% Citric acid | ² 18 |
| 0.1% Malic acid | ² 18 |
| 0.05% Propyl para hydroxy benzoate<br>0.05% Tartaric acid | ² 41 |
| 0.05% Butyl para hydroxy benzoate<br>0.05% Citric acid | ² 41 |
| 0.05% Benzyl para hydroxy benzoate<br>0.05% Malic acid | ² 45 |

[1] Margarine as obtained in Example II.
² Off flavors determined organoleptically.

On the basis of tests, the esters of aromatic para hydroxy mono-basic acids and aliphatic hydroxy polybasic acids when used separately increase the keeping time of butter, under normal marketing and household refrigeration conditions, on an average about fourteen days, but when used in combinations, increase the keeping time on an average about seventy days. Likewise, the tests indicate that when esters of aromatic para hydroxy mono-basic acids and aliphatic hydroxy polybasic acids are used separately, the keeping time of margarine, under ordinary marketing and household refrigeration conditions, increases on an average about thirty-five days, and, when used in combinations, the keeping time is increased on an average about 136 days.

The tests also indicate that when esters of aromatic para hydroxy mono-basic acids in double the amount are used, the increase in keeping time is not significant; likewise, when aliphatic hydroxy polybasic acids are used, the increase in keeping time is negligible.

Combinations of low molar alcohol esters of aromatic para hydroxy mono-basic acids and aliphatic hydroxy polybasic acids may be used to advantage to protect creamery butter as manufactured by commercial methods now in general use. By adding an ester of aromatic para hydroxy mono-basic acid, as propyl para hydroxy benzoate, and an aliphatic hydroxy polybasic acid, as tartaric acid, the keeping qualities of butter can be improved at least 40% to 50% when kept under normal marketing and household refrigeration conditions.

Sodium alginate forms a tight finely dispersed salt-water-in-butter-fat emulsion when used in a 1½% solution. Tight emulsions retard deterioration of butter and increase the keeping quality on an average about 15% to 20%.

Mixtures of two or more of the esters of aromatic para hydroxy mono-basic acids and mixtures of two or more aromatic para hydroxy mono-basic acids may be used in combinations to improve the keeping quality of butter and margarine.

On account of the many variations and the amount of unsaturated fatty glycerides in butter fat and the use of lecithin in margine, the accumulation of metal from processing equipment, and the use of flavor and color compounds, all of which bring about oxidative deterioration, mixtures of the esters of aromatic para hydroxy mono-basic acids and aliphatic hydroxy polybasic acids may be used in quantities of from 0.02% to 0.2% of the weight of the fatty glycerides.

The term "butter fat" as used herein is intended to include hydrogenated butter fat.

The term "aqueous product" as used herein is intended to mean either water, brine, milk or a milk product.

Having described my invention, I claim:

1. An edible food product comprising an emulsion of fatty glycerides and an aqueous product containing substantially equal proportions of an aliphatic hydroxy polybasic acid selected from the group consisting of tartaric, citric and malic acids and an aromatic para hydroxy monobasic acid ester selected from the group consisting of propyl, butyl and benzyl hydroxy benzoate.

2. A butter product comprising an emulsion of butter fat and salt water containing a water soluble vegetable gum emulsifier and substantially equal proportions of an aliphatic hydroxy polybasic acid selected from the group consisting of tartaric, citric and malic acids and an aromatic para hydroxy monobasic acid ester selected from the group consisting of propyl, butyl and benzyl hydroxy benzoate.

3. The product of claim 2 further characterized in that said emulsifier comprises a water soluble alginate.

4. A butter product comprising an emulsion of butter fat and salt water containing a water soluble alginate emulsifier and substantially equal proportions of tartaric acid and an aromatic para hydroxy monobasic acid ester selected from the group consisting of propyl, butyl and benzyl hydroxy benzoate.

5. A butter product comprising an emulsion of butter fat and salt water containing a water soluble alginate emulsifier and substantially equal proportions of citric acid and an aromatic para hydroxy monobasic acid ester selected from the group consisting of propyl, butyl and benzyl hydroxy benzoate.

6. A butter product comprising an emulsion of butter fat and salt water containing a water soluble alginate emulsifier and substantially equal proportions of malic acid and an aromatic para hydroxy monobasic acid ester selected from the group consisting of propyl, butyl and benzyl hydroxy benzoate.

7. A margarine containing substantially equal proportions of an aliphatic hydroxy polybasic acid selected from the group consisting of tartaric, citric and malic acids and an aromatic para hydroxy monobasic acid ester selected from the group consisting of propyl, butyl and benzyl hydroxy benzoate.

8. A margarine comprising an emulsion of fatty glycerides, salt, and a milk product, and containing substantially equal proportions of an aliphatic hydroxy polybasic acid selected from the group consisting of tartaric, citric and malic acids and an aromatic para hydroxy monobasic acid ester selected from the group consisting of propyl, butyl and benzyl hydroxy benzoate.

9. A margarine comprising an emulsion of fatty glycerides, salt, and milk, and containing substantially equal proportions of an aliphatic hydroxy polybasic acid selected from the group consisting of tartaric, citric and malic acids and an aromatic para hydroxy monobasic acid ester selected from the group consisting of propyl, butyl and benzyl hydroxy benzoate.

FREDERIC H. PENN.

REFERENCES CITED

The following references are of record in the file of this patent:

UNITED STATES PATENTS

| Number | Name | Date |
| --- | --- | --- |
| 1,073,135 | Jolles | Sept. 16, 1913 |
| 1,311,709 | Plaisance | July 29, 1919 |
| 1,627,342 | Sabalitschka | May 3, 1927 |
| 2,156,036 | Wilt | Apr. 25, 1939 |
| 2,103,497 | Schneider | Dec. 28, 1937 |

FOREIGN PATENTS

| Number | Country | Date |
| --- | --- | --- |
| 12,839 | Great Britain | A. D. 1911 |

OTHER REFERENCES

"Antioxidants for Edible Fats and Oils" by H. S. Olcott—Oil and Soap, April, 1941, pages 78 and 79.

"The Butter Industry"—Hunziker, ed. 3, 1941, Pages 596 and 597.